United States Patent
Chung et al.

(10) Patent No.: US 11,366,584 B2
(45) Date of Patent: Jun. 21, 2022

(54) METHOD FOR PROVIDING FUNCTION OR CONTENT ASSOCIATED WITH APPLICATION, AND ELECTRONIC DEVICE FOR CARRYING OUT SAME

(71) Applicant: SAMSUNG ELECTRONICS CO., LTD., Suwon-si (KR)

(72) Inventors: Jinkyo Chung, Suwon-si (KR); Hyemi Lee, Suwon-si (KR); Sungho Park, Suwon-si (KR); Joonhwan Kim, Suwon-si (KR); Hanna Kim, Suwon-si (KR); Ahreum Nam, Suwon-si (KR); Daeun Park, Suwon-si (KR); Bona Lee, Suwon-si (KR); Jihun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/965,116

(22) PCT Filed: Feb. 14, 2019

(86) PCT No.: PCT/KR2019/001810
§ 371 (c)(1),
(2) Date: Jul. 27, 2020

(87) PCT Pub. No.: WO2019/160345
PCT Pub. Date: Aug. 22, 2019

(65) Prior Publication Data
US 2021/0034210 A1  Feb. 4, 2021

(30) Foreign Application Priority Data
Feb. 14, 2018  (KR) .......................... 10-2018-0018148

(51) Int. Cl.
*G06F 3/0488* (2022.01)
*G06F 3/041* (2006.01)
(Continued)

(52) U.S. Cl.
CPC .......... *G06F 3/0488* (2013.01); *G06F 3/0414* (2013.01); *H04M 1/72403* (2021.01);
(Continued)

(58) Field of Classification Search
CPC .... G06F 1/1624; G06F 1/1626; G06F 1/1652; G06F 1/1671; G06F 2203/04105;
(Continued)

(56) References Cited

U.S. PATENT DOCUMENTS 7,881,244 B2   2/2011  Balay et al.
8,174,628 B2   5/2012  Matsushita et al.
(Continued)

FOREIGN PATENT DOCUMENTS

EP    1 970 886      6/2015
JP    2013-137750    7/2013
(Continued)

OTHER PUBLICATIONS

International Search Report for PCT/KR2019/001810, dated Jun. 10, 2019, 4 pages.
(Continued)

*Primary Examiner* — Afroza Chowdhury
(74) *Attorney, Agent, or Firm* — Nixon & Vanderhye, P.C.

(57) ABSTRACT

Disclosed, according to various embodiments of the present invention, is an electronic device comprising: a housing comprising a cover glass and a rear cover facing the cover glass; a display comprising a first region and a second region connected to one end of the first region, and having a first state where the first region is exposed, via the cover glass,
(Continued)

to the outside of the electronic device, and a second state where the first region and the second region are exposed, via the cover glass, to the outside of the electronic device; and a processor electrically connected to the display. The processor may be configured so as to control the outputting of content on the basis of the state of the display. In addition, various embodiments are possible as identified in the specification.

13 Claims, 12 Drawing Sheets

(51) Int. Cl.
   *H04M 1/725* (2021.01)
   *H04M 1/72448* (2021.01)
   *H04M 1/72403* (2021.01)

(52) U.S. Cl.
   CPC .................. *H04M 1/72448* (2021.01); *G06F 2203/04105* (2013.01); *H04M 2250/22* (2013.01)

(58) Field of Classification Search
   CPC ......... G06F 2203/04803; G06F 3/0414; G06F 3/0481; G06F 3/0488; G06F 3/04883; H04M 1/72403; H04M 1/72448; H04M 2250/22
   See application file for complete search history.

(56) References Cited

U.S. PATENT DOCUMENTS

| | | | |
|---|---|---|---|
| 8,275,420 B2* | 9/2012 | Lim | .................... H04M 1/0266 455/566 |
| 9,086,731 B2 | 7/2015 | Hisano et al. | |
| 9,817,544 B2 | 11/2017 | Hisano et al. | |
| 2009/0051830 A1 | 2/2009 | Matsushita et al. | |
| 2010/0167791 A1* | 7/2010 | Lim | .................... H04M 1/0266 455/566 |
| 2013/0135234 A1 | 5/2013 | Hisano et al. | |
| 2015/0338888 A1 | 11/2015 | Kim et al. | |
| 2015/0370448 A1 | 12/2015 | Hisano et al. | |
| 2017/0046025 A1 | 2/2017 | Dascola et al. | |
| 2017/0154609 A1 | 6/2017 | Yoon et al. | |
| 2017/0315694 A1 | 11/2017 | Alonso Ruiz et al. | |
| 2019/0163358 A1 | 5/2019 | Dascola et al. | |
| 2019/0171354 A1 | 6/2019 | Dascola et al. | |

FOREIGN PATENT DOCUMENTS

| | | |
|---|---|---|
| KR | 10-2016-0032079 | 3/2016 |
| KR | 10-2017-0062327 | 6/2017 |
| KR | 10-2017-0083404 | 7/2017 |

OTHER PUBLICATIONS

Written Opinion of the ISA for PCT/KR2019/001810, dated Jun. 10, 2019, 5 pages.

* cited by examiner

METHOD FOR PROVIDING FUNCTION OR CONTENT ASSOCIATED WITH APPLICATION, AND ELECTRONIC DEVICE FOR CARRYING OUT SAME

This application is the U.S. national phase of International Application No. PCT/KR2019/001810 filed 14 Feb. 2019, which designated the U.S. and claims priority to KR Patent Application No. 10-2018-0018148 filed 14 Feb. 2018, the entire contents of each of which are hereby incorporated by reference.

FIELD

Embodiments disclosed in this specification related to an electronic device that provides a function or content associated with an application.

DESCRIPTION OF RELATED ART

With the development of information technology (IT), various types of electronic devices, which are capable of executing applications, such as a smartphone, a tablet personal computer (PC), and the like are being widely supplied.

The electronic devices may provide various functions to a user through a plurality of applications. For example, the user may listen to the desired music through an audio playback application, and may deliver a message to another user through a message application. For another example, the user may speak to another user through a phone application.

The inputs and outputs of the applications may be made through a display. For example, the user may perform the operations by providing a user input to the display, and may identify an output screen corresponding to a user input through the display. Furthermore, electronic devices including a rollable display have been recently introduced with the demand for a wider display.

Applications may provide pieces of additional information, such as the function or content associated with the application, in addition to providing the user with a basic function. For example, the audio playback application may provide information of a playlist currently being played, in addition to the playback of a sound source. For another example, in addition to providing a call function to another user, a phone application may provide list information of other users that the user frequently contacts.

SUMMARY

A plurality of input processes may be required for a user to receive the above-described function or content. For example, when the user desires to identify playlist information, there is a need for the plurality of processes that execute an audio playback application, select a menu button, and then select a playlist button. Besides, when an electronic device is in a lock screen state, an operation in which the lock screen state needs to be released to obtain the additional information may be additionally required. In this case, the user may feel uncomfortable because a plurality of processes are required to obtain simple information.

In addition, when the additional information is output on a display, the output of the additional information may prevent the user from identifying other content previously displayed on the display. For example, when the user watches a video in the partial region of the display by using a multi-window function or the like, the output of the additional information may prevent the user from watching the video. For this reason, the user may feel uncomfortable upon using the electronic device.

According to an embodiment disclosed in this specification, an electronic device may include a housing including a cover glass and a rear cover facing the cover glass, a display including a first region and a second region connected to one end of the first region, and having a first state where the first region is exposed to an outside of the electronic device via the cover glass and a second state where the first region and the second region are exposed to the outside of the electronic device via the cover glass, and a processor electrically connected to the display. The processor may be configured to obtain a first input of a user, to set a function or content associated with an application based on the first input, to output an object corresponding to the application, to the first region while the display is in the first state, to obtain a second input of a user, which is input to the object, and to output a screen for the set function or content to the display when the display is changed from the first state to the second state by the second input.

Furthermore, according to an embodiment disclosed in this specification, a method in which an electronic device provides a function or content associated with an application may include obtaining a first input of a user, setting a function or content associated with an application based on the first input, outputting an object corresponding to the application to the first region while a display including a first region and a second region connected to one end of the first region is in a first state, obtaining a second input of a user, which is input to the object, and outputting a screen for the set function or content to the display when the display is changed from the first state to a second state by the second input. The first state may be a state where the first region is exposed to an outside of an electronic device via a cover glass. The second state may be a state where the first region and the second region are exposed to the outside of the electronic device via the cover glass.

Moreover, according to an embodiment disclosed in this specification, an electronic device may include a housing including a cover glass and a rear cover facing the cover glass, a display including a first region and a second region connected to one end of the first region, and having a first state where the first region is exposed to an outside of the electronic device via the cover glass and a second state where the first region and the second region are exposed to the outside of the electronic device via the cover glass, and a processor electrically connected to the display. The processor may be configured to output an object corresponding to an application, to the first region while the display is in the first state, to obtain a user input, which is input to the object, and to output a screen for a specified function or specified content associated with the application to the display when the display is changed from the first state to the second state by the user input.

According to embodiments disclosed in the specification, an electronic device may provide a user with the function or content associated with an application, through only a minimal user input. Besides, the electronic device may provide the user with the function or content without affecting other objects or other content already output on a display. In this way, the use convenience of the user may be improved. Besides, a variety of effects directly or indirectly understood through the disclosure may be provided.

BRIEF DESCRIPTION OF THE DRAWINGS

With regard to description of drawings, the same or similar components may be marked by the same or similar reference numerals.

Referring to FIG. 1, an electronic device 100 or 100A may include housing 110 and a display 120. In an embodiment, it may be indicated that the electronic device 100 is in a state before the display 120 is expanded. In another embodiment, it may be indicated that the electronic device 100A is in a state where the display 120 is expanded. For example, when a user 1 pushes the display 120 with his/her finger while supporting the electronic device 100 with his/her hand, a partial region 122 of the display 120 located inside the electronic device 100 may be exposed toward the outside of the electronic device 100A.

Figure 1:
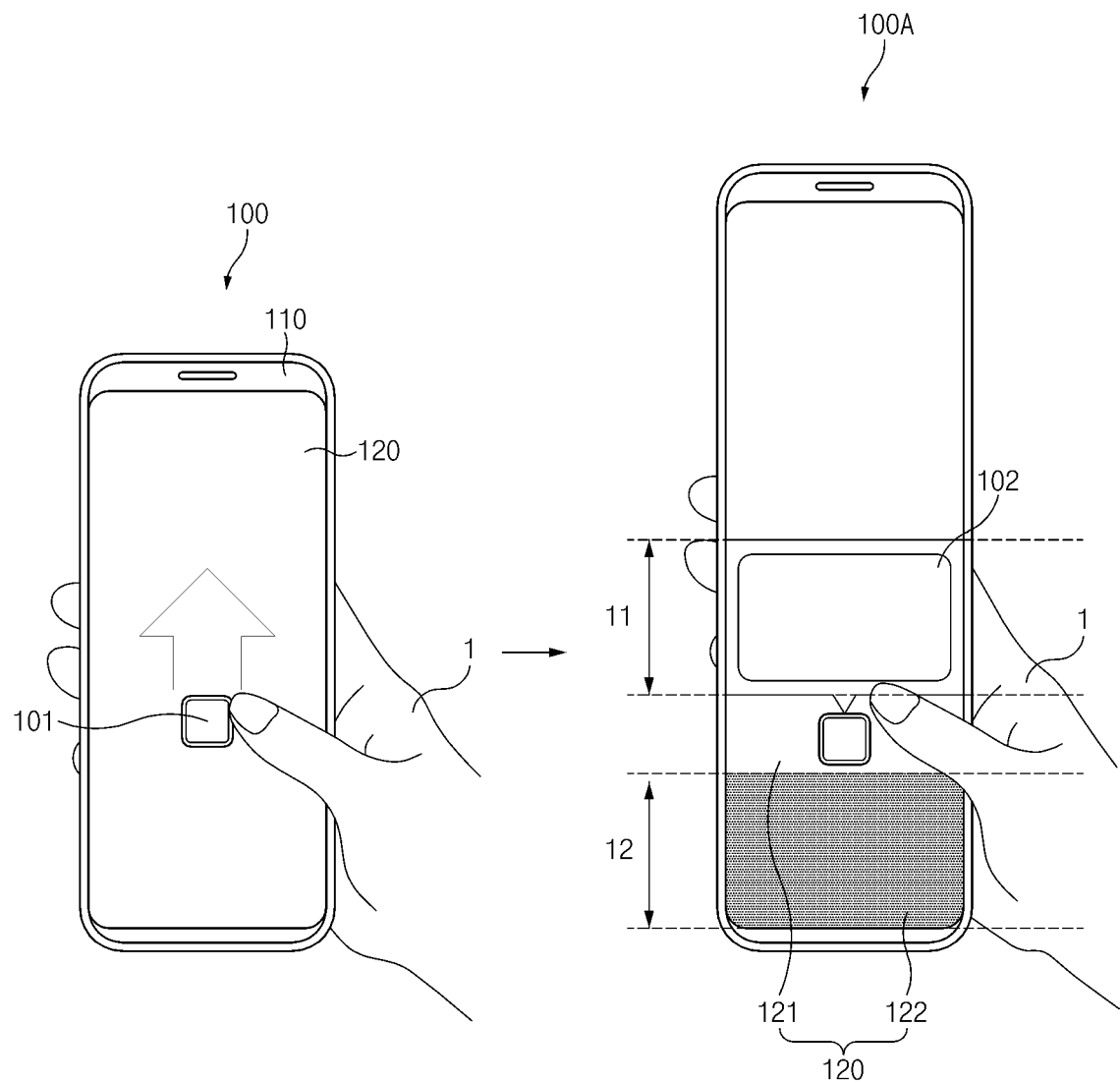
FIG. 1 illustrates an electronic device according to various embodiments.

In this specification, it may be understood that the electronic device 100 and the electronic device 100A are the same device as each other only with the difference in state. That is, the electronic device 100 may be changed to the state of the electronic device 100A, and the electronic device 100A may be changed to the state of the electronic device 100.

The housing 110 may include a cover glass and a rear cover facing the cover glass. According to an embodiment, the housing 110 may further include a side member surrounding the space between the cover glass and the rear cover. According to an embodiment, the cover glass may include a part of the side member as a configuration. The housing 110 may protect the configuration inside the electronic device 100 or 100A from the outside.

According to an embodiment, the housing 110 may be a flexible housing or a rollable housing. For example, at least part of the housing 110, for example, the cover glass, may be bent and rolled into the interior of the electronic device 100 and 100A or pushed out to the outside of the electronic device 100 and 100A.

According to an embodiment, as the display 120 is expanded, the region, which is exposed to the outside, in at least part of the housing 110 may be widened. For example, the cover glass in the electronic device 100A may be longer upward and downward than the cover glass in the electronic device 100; the region of the cover glass exposed to the outside may be widened. For another example, the rear cover may include a first rear cover and a second rear cover surrounding at least part of the first rear cover. When the display 120 is expanded, at least part of the first rear cover may be exposed outside the second rear cover, and a region, which is exposed to the outside, in the rear cover may be widened.

The display 120 may be exposed to the outside of the electronic device 100 or 100A via a cover glass. According to an embodiment, the display 120 may include a first region 121 and a second region 122 connected to one end of the first region 121. According to an embodiment, the display 120 may be a flexible display or a rollable display. For example, at least part of the display 120, for example, the second region 122, may be bent and rolled into the electronic device 100 or 100A or pushed out to the outside of the electronic device 100 or 100A.

According to various embodiments, only the first region 121 of the display 120 may be exposed to the outside through the cover glass, and both the first region 121 and the second region 122 may be exposed to the outside via the cover glass. In other words, the display 120 may have a first state where the first region 121 is exposed to the outside, and a second state where both the first region 121 and the second region 122 are exposed to the outside. For example, it may be understood that the display 120 of the electronic device 100 is in a first state; it may be understood that the display 120 of the electronic device 100A is in a second state.

According to various embodiments, the display 120 may be changed from the first state to the second state or from the second state to the first state, by a user input. For example, the state of the display 120 may be changed by the pressure of the user input applied to the cover glass or the rear cover, in a specified direction, for example, an up-down direction on the cover glass. For another example, the state of the display 120 may be changed by a user input to a physical button (not illustrated) included in the housing 110.

According to an embodiment, the electronic device 100 may output an object 101 to the first region 121 while the display 120 is in the first state. The object 101 may correspond to the specified application. For example, when the user 1 touches the object 101, the electronic device 100 may execute the specified application.

According to an embodiment, when the user 1 applies the specified user input to the object 101, the state of the display 120 may be changed from the first state to the second state by the user input. According to various embodiments, the specified user input may include the pressure applied to the cover glass or the rear cover in a specified direction, or may include an input to the physical button (not illustrated).

In an embodiment, when the state of the display 120 becomes the second state, the electronic device 100A may output a screen 102 for additional information associated with the specified application to the display 120. For example, the screen 102 for the additional information may be a screen for a function or content associated with the specified application. According to various embodiments, the screen 102 for the additional information may be preset by the user 1 or may be previously designated in response to the specified application. In various embodiments, the user 1 may obtain the additional information, for example, the function or content associated with an application, by not a plurality of processes but a single operation.

According to an embodiment, the electronic device 100A may output the screen 102 for the additional information to the region of the display 120 with a specified size. For example, the height 11 at which the screen 102 for the additional information is output may be smaller than or equal to the height 12 of the second region. In this way, other objects other than the object 101 among a plurality of objects capable of being output on the display 120 may be output on the display 120 regardless of the output of the additional information.

In the disclosure, the description given with reference to FIG. 1 may be identically applied to components having the same reference numerals/marks as the components of the electronic device 100 or 100A described with reference to FIG. 1.

Figure 2:
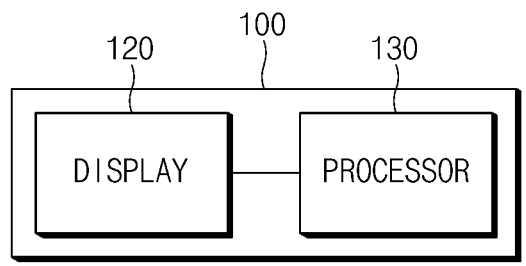
FIG. 2 illustrates a block diagram of an electronic device according to an embodiment.

FIG. 2 illustrates a block diagram of an electronic device according to an embodiment.

Referring to FIG. 2, the electronic device 100 may include a display 120 and a processor 130. According to various embodiments, the electronic device 100 may further include a configuration not illustrated in FIG. 2. For example, the electronic device 100 may further include the housing 110 that forms the exterior of the electronic device 100 and protects other components (e.g., the display 120 and the processor 130) from the outside. For another example, the electronic device 100 may further include at least one sensor sensing a user's input, such as a touch sensor or a pressure sensor.

The display 120 may output at least one content or object (e.g., a text, an image, a video, an icon, a widget, a symbol, or the like). For example, the display 120 may include a liquid crystal display (LCD), a light-emitting diode (LED) display, an organic LED (OLED) display, a microelectromechanical systems (MEMS) display, or an electronic paper display.

According to an embodiment, the display 120 may have a first state and a second state depending on the region of the display 120 exposed to the outside. The first state may be a state where a part (e.g., the second region 122 of FIG. 1) of the display 120 is not exposed to the outside. The second state may be a state where the whole region (e.g., the first region 121 and the second region 122 of FIG. 1) of the display 120 are exposed to the outside.

According to various embodiments, the display 120 may have a third state where a part of the second region is exposed to the outside and the remaining parts of the second region are not exposed to the outside.

According to an embodiment, the display 120 may include a touch panel (or a touch sensor) or may be integrally implemented with the touch panel. In this case, the display 120 may also be referred to as a touch screen panel (TSP) or a touch screen display panel. In an embodiment, the electronic device 100 may obtain coordinates at a location where a user's input (or a touch) occurs through the touch panel. In an embodiment, the electronic device 100 may determine whether the user's input has continuously occurred at a specified location during a specified time through the touch panel.

According to an embodiment, a pressure sensor may be disposed in at least part of the region of the display 120. The pressure sensor may detect the pressure (or force) of an external object (e.g., a user's finger or an electronic pen) to the display 120. According to an embodiment, the pressure sensor may detect the pressure applied to at least part of the region of the display 120. In an embodiment, the electronic device 100 may determine whether a user's input with a pressure of a specified strength is generated, through the pressure sensor.

The processor 130 may be electrically connected with the components included in the electronic device 100 and may execute operations or data processing associated with control and/or communication of the components. For example, the processor 130 may deliver image data to the display 120 (or a display driving circuit) such that the display 120 outputs the specified screen based on the specified event. For another example, the processor 130 may calculate the coordinates of a location where the user's input occurs or the pressure strength of the user's input, through the user's input detected by at least one sensor.

In the disclosure, the description given with reference to FIG. 2 may be identically applied to components having the same reference numerals/marks as the components of the electronic device 100 described with reference to FIG. 2.

Figure 3:
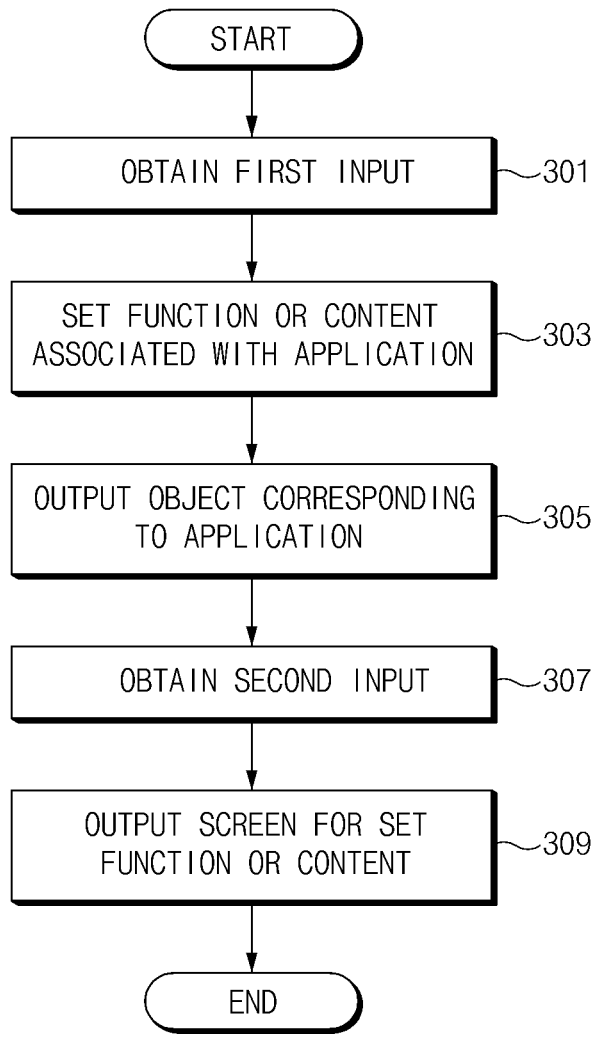
FIG. 3 illustrates a flowchart, in which an electronic device provides a user with a function or content associated with an application, according to an embodiment.

FIG. 3 illustrates a flowchart, in which an electronic device provides a user with a function or content associated with an application, according to an embodiment.

Referring to FIG. 3, a method in which the electronic device 100 provides the user 1 with a function or content associated with an application may include operation 301 to operation 309. According to an embodiment, it may be understood that operation 301 to operation 309 are performed by the electronic device 100 or the processor 130.

In an embodiment, operation 301 to operation 309 may have a temporal break between respective operations. For example, there may be a temporal break between operation 303 and operation 305; the electronic device 100 may perform various operations not illustrated in FIG. 3 during the temporal disconnection. The various operations may be performed independently of operation 301 to operation 309, and may not affect operation 301 to operation 309.

In operation 301, the electronic device 100 may obtain a user's first input. The first input may include a plurality of user inputs. For example, the first input may include a user input to move to a setting screen of the electronic device 100. For another example, the first input may include a user input to select one of pieces of additional information associated with at least one application. The additional information may be the function or content associated with an application.

In operation 303, the electronic device 100 may set the function or content associated with the application based on the first input. According to an embodiment, the application may include at least one application. For example, the electronic device 100 may set the function or content associated with a phone application based on the first input. For another example, the electronic device 100 may set the function or content associated with the message application as well as the function or content associated with the phone application, based on the first input.

According to an embodiment, the function or content associated with the application may vary depending on the application. For example, in the case of a phone application, the function or content may include favorite information, an emergency call function, or an address book search function. When the specified input (e.g., a second input in operation 307) of a user to the application occurs by selecting one of the plurality of functions or content, the user may set the function or content to be provided by the electronic device 100.

In operation 305, the electronic device 100 may output an object corresponding to the application to the display 120. For example, the object may be content for executing the application.

In operation 307, the electronic device 100 may obtain the user's second input. The second input may be the user's input to the object. According to an embodiment, the second input may change the state of the display 120 from a first state to a second state.

For example, the second input may include an operation of pushing up the display 120 while a touch is made at a location where the object is output. The state of the display 120 may be changed from the first state to the second state by pushing up the display 120.

For another example, the second input may include a first operation in which a touch is made at a location where the object is output, and a second operation in which an input to a physical button for changing the state of the display 120 is performed. The first operation and the second operation may be performed simultaneously or sequentially.

In operation 309, the electronic device 100 may output a screen for the set function or content, on the display 120. Because the region of the display 120 is expanded by the second input in operation 307, the electronic device 100 may output a screen for the function or content set in operation 303 to at least part of the expanded region. For example, the screen for the function or content may be displayed to be equal to or smaller than the size of the expanded region.

Through operation 301 to operation 309, the electronic device 100 may output the preset function or preset content for the application, to the expanded region of the display 120 in response to an input of the user.

Figure 4:
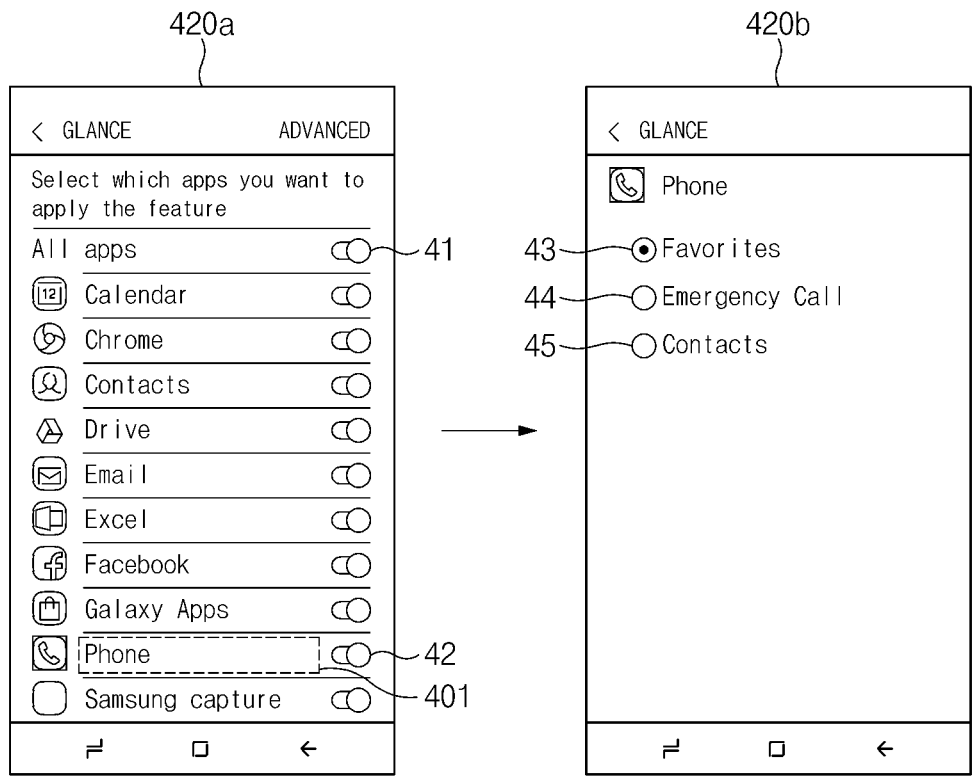
FIG. 4 illustrates a method of setting a function or content associated with an application in an electronic device, according to an embodiment.

FIG. 4 illustrates a method of setting a function or content associated with an application in an electronic device, according to an embodiment.

Referring to FIG. 4, a method of setting the function or content associated with an application in the electronic device 100 may include a plurality of steps. In an embodiment, for example, the plurality of steps illustrated in FIG. 4 may correspond to operation 301 and operation 303 illustrated in FIG. 3. According to various embodiments, a method of setting the function or content associated with an application in the electronic device 100 may further include additional steps in addition to the steps illustrated in FIG. 4, or some of the steps illustrated in FIG. 4 may be omitted.

The first screen 420a may indicate a state of entering a screen for setting the function of the electronic device 100 by the user's input (e.g., the first input in FIG. 3). For example, the function may be a function to output a screen for additional information associated with an application based on a user's specified input. In an embodiment, the additional information may be the function or content associated with the application.

In the state of the first screen 420a, the electronic device 100 may select an application, to which the function is applied, based on the user's input. According to an embodiment, when the user's input to a first object 41 occurs, the electronic device 100 may be configured to apply the function to all applications or not to apply the function to all applications. For example, when the user's input to the first object 41 occurs in the state of the first screen 420a, the electronic device 100 may collectively configured not to apply the function to all applications. Afterward, when the user's input to the first object 41 occurs again, the electronic device 100 may be collectively configured to apply the function to all applications.

According to an embodiment, the electronic device 100 may be individually set whether to apply the function to each application, based on the user's input. For example, when the user's input to the second object 42 occurs, the electronic device 100 may be individually configured not to apply the function to the phone application. Afterward, when the user's input to the second object 42 occurs again, the electronic device 100 may be individually configured to apply the function to the phone application.

According to an embodiment, the electronic device 100 may change a screen output from the first screen 420a to a detailed setting screen for each application, based on a user's input. In other words, when the user's input to a region (e.g., a region 401 where a phone application is output) where any one application is output occurs, the screen may be changed to the detailed setting screen for the one application.

The state of a second screen 420b may indicate a case where the user's input to a region where any one application is output, for example, the region 401 where a phone application is output, occurs in the state of the first screen 420a. In the state of the second screen 420b, the electronic device 100 may be configured to output any one function or content among a plurality of functions or content for a phone application, based on the user's input. For example, when the user's input to a third object 43 occurs, the additional information about the phone application may be favorite information. For another example, when the user's input to a fourth object 44 occurs, the additional information about the phone application may be an emergency call function. For another example, when the user's input to a fifth object 45 occurs, the additional information about the phone application may be an address book search function.

As described above, when any one item is selected on the second screen 420b by the user's input, the additional information about the corresponding application may be set to the selected item.

Figure 5:
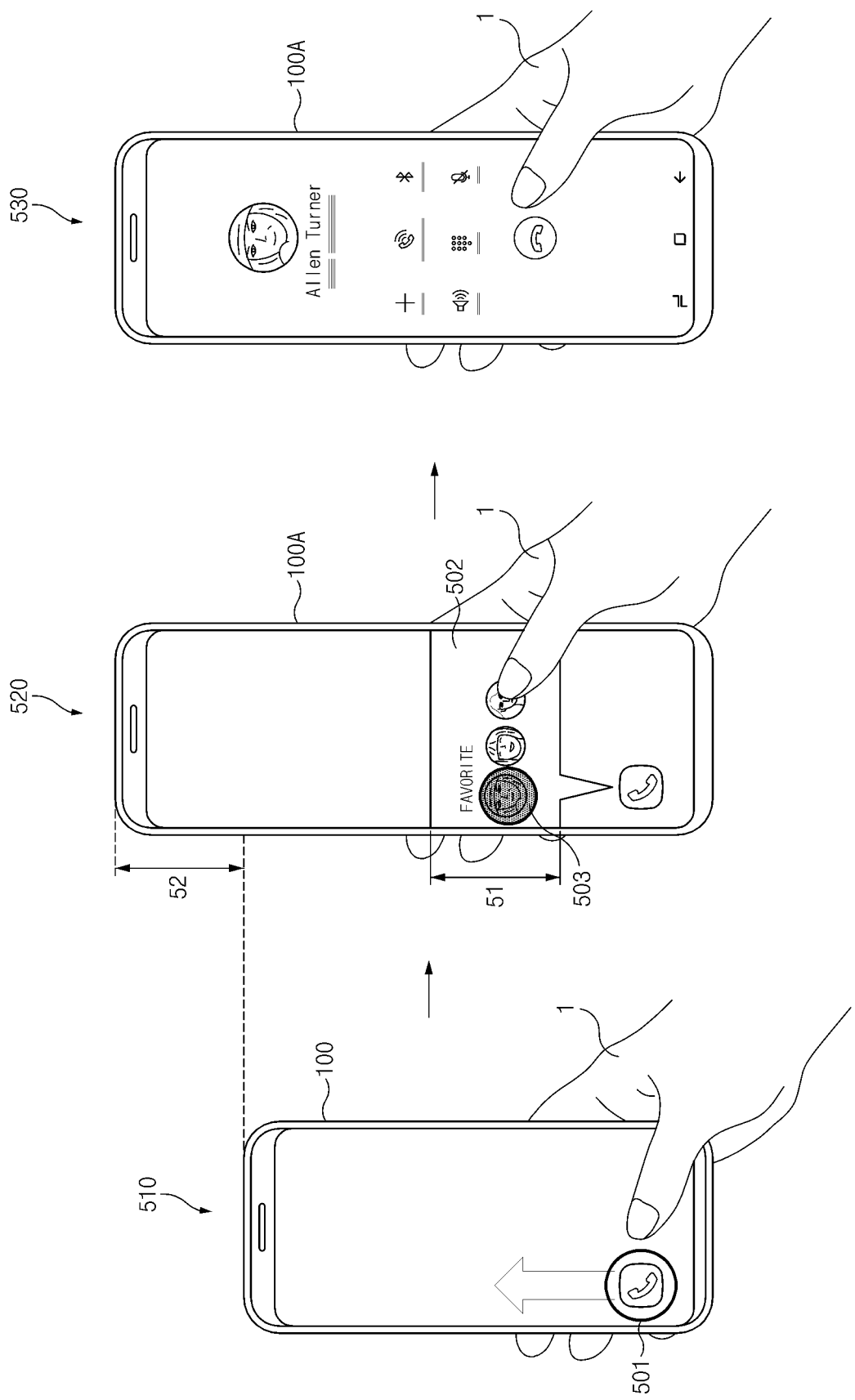
FIG. 5 illustrates a method in which an electronic device provides a user with a function or content associated with a phone application according to an embodiment.

FIG. 5 illustrates a method in which an electronic device provides a user with a function or content associated with a phone application according to an embodiment.

Referring to FIG. 5, a method of setting the function or content associated with a phone application in the electronic device 100 may include a plurality of steps. In an embodiment, for example, the plurality of steps illustrated in FIG. 5 may include steps corresponding to operation 305 to operation 309 illustrated in FIG. 3.

In the first step 510, the electronic device 100 may obtain the input of the user 1 (e.g., the second input in FIG. 3) to the object 501 output to the display 120. The object 501 may be an object for executing the corresponding application. For example, the object 501 may be an object for executing the phone application. According to an embodiment, the input of the user 1 may change the state of the display 120 from the first state to the second state.

In the second step 520, the electronic device 100A may output a screen 502 for a preset function or content associated with the application. According to an embodiment, the set function or content associated with the phone application may be favorite information as illustrated in FIG. 5. According to another embodiment, unlike illustration in FIG. 5, the set function or content associated with the phone application may be either an emergency call function or an address book search function.

According to an embodiment, the height 51 of the screen 502 output in the second step 520 may be smaller than or equal to the height 52 of the region where the display 120 is extended. In this way, other objects output on the display 120 in the first step 510 may not be affected by the output screen 502.

According to an embodiment, in the second step 520, the electronic device 100A may obtain the third input of the user 1 to the output screen 502. For example, as illustrated in FIG. 5, the electronic device 100A may obtain a third input to any one contact address in the favorite information.

In a third step 530, the electronic device 100A may perform an operation corresponding to the third input. For example, as illustrated in FIG. 5, the electronic device 100A may perform an operation of attempting to make a call to the contact address selected in response to the third input.

Through the process, the user 1 may perform an operation of attempting to make a call to the contact address registered in the favorite information, through a simpler manipulation.

Figure 6A:
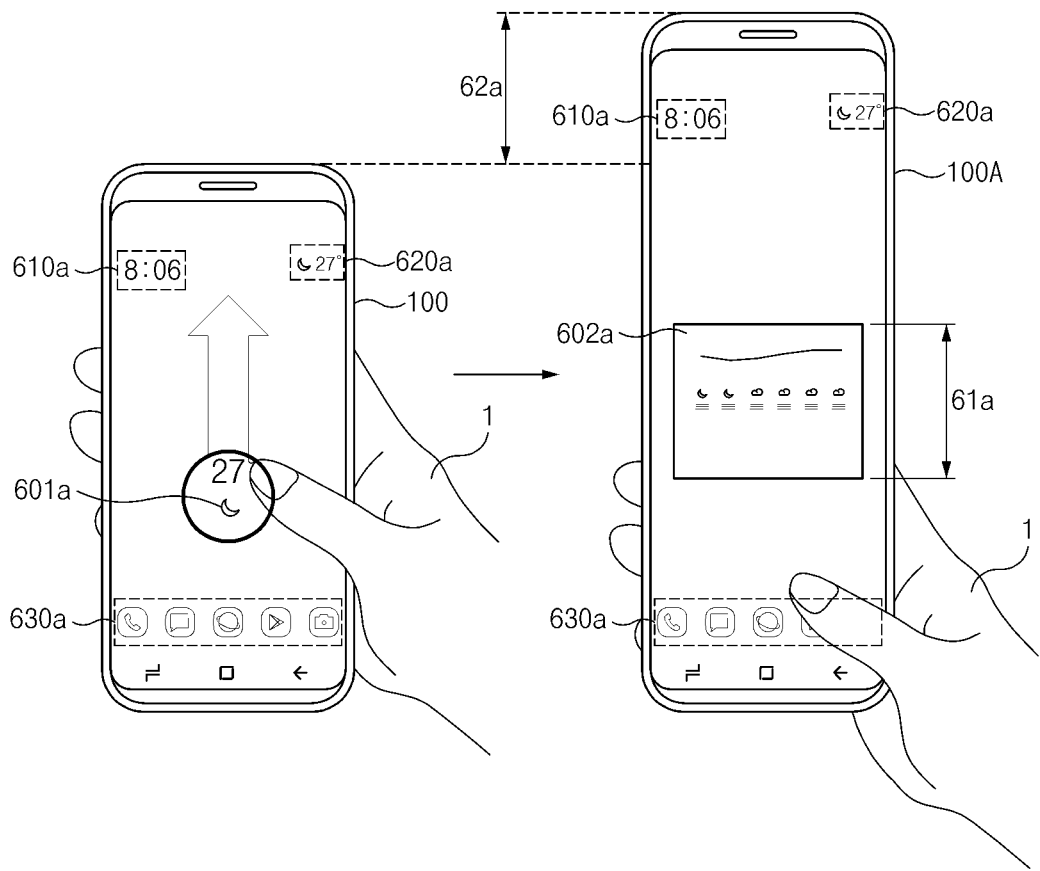
FIG. 6A illustrates a method in which an electronic device provides a user with a function or content associated with an application in a home screen state according to an embodiment.

FIG. 6A illustrates a method in which an electronic device provides a user with a function or content associated with an application in a home screen state according to an embodiment. FIG. 6A illustrates a method in which an electronic device provides a user with a function or content associated with an application in a home screen state according to another embodiment.

Figure 6B:
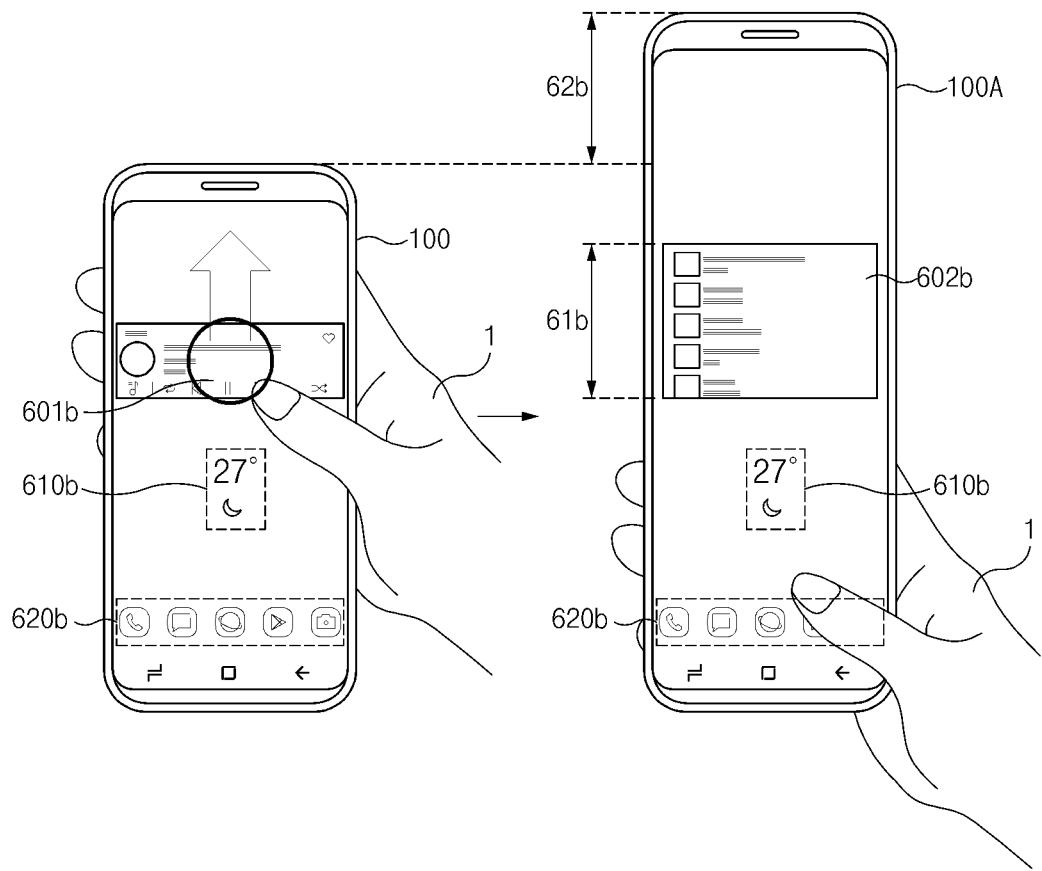
FIG. 6B illustrates a method in which an electronic device provides a user with a function or content associated with an application in a home screen state according to another embodiment.

Referring to FIGS. 6A and 6B, the electronic device 100 may indicate a case where the display 120 is in the first state; the electronic device 100A may indicate a case where the display is in the second state. In an embodiment, the electronic device 100 or 100A may be a home screen state, not a lock screen state. In FIG. 6B, with regard to the description given with reference to FIG. 6A, additional description will be omitted to avoid redundancy.

Referring to FIG. 6A, an object 601a output to the electronic device 100 that is in a home screen state may be an object corresponding to a weather application. According to an embodiment, the input (e.g., the second input in FIG. 3) of the user 1 to the object 601a may occur. In this case, the state of the display 120 may be changed from the first state to the second state, and the electronic device 100A may output a screen 602a for specified additional information associated with a weather application. In an embodiment, the additional information may be specified content associated with the weather application, such as content for a weekly weather.

According to an embodiment, the height 61a of the region where the specified content is output may be smaller than or equal to the height 62a of a region where the display is extended. In this way, other objects 610a, 620a, and 630a that have been output to the display 120 in the first state may not be affected by the output of the specified content. For example, a first object 610a for a clock application, a second object 620a for a weather application, or a third objects 630a for executing various applications may not be affected by the output of content for the weekly weather. In an embodiment, when the display 120 is in the second state, at least part of the first object 610a, the second object 620a, and the third object 630a may be output as it is at the location where at least part of the first object 610a, the second object 620a, and the third object 630a has been output when the display 120 is in the first state.

Referring to FIG. 6B, an object 601b output to the electronic device 100 that is in a home screen state may be an object corresponding to an audio playback application. According to an embodiment, the input (e.g., the second input in FIG. 3) of the user 1 to the object 601b may occur. In this case, the state of the display 120 may be changed from the first state to the second state, and the electronic device 100A may output a screen 602b for specified additional information associated with the audio playback application. In an embodiment, the additional information may be specified content associated with the audio playback application, for example, the content for a playlist.

According to an embodiment, the height 61b of the region where the specified content is output may be smaller than or equal to the height 62b of a region where the display is extended. In this way, for example, a first object 610b for a weather application or a second objects 620b for execution of various applications may not be affected by the output of content for the playlist. In an embodiment, when the display 120 is in the second state, at least part of the first object 610b and the second object 620b may be output as it is at the location where the at least part of the first object 610b and the second object 620b has been output when the display 120 is in the first state.

Figure 7A:
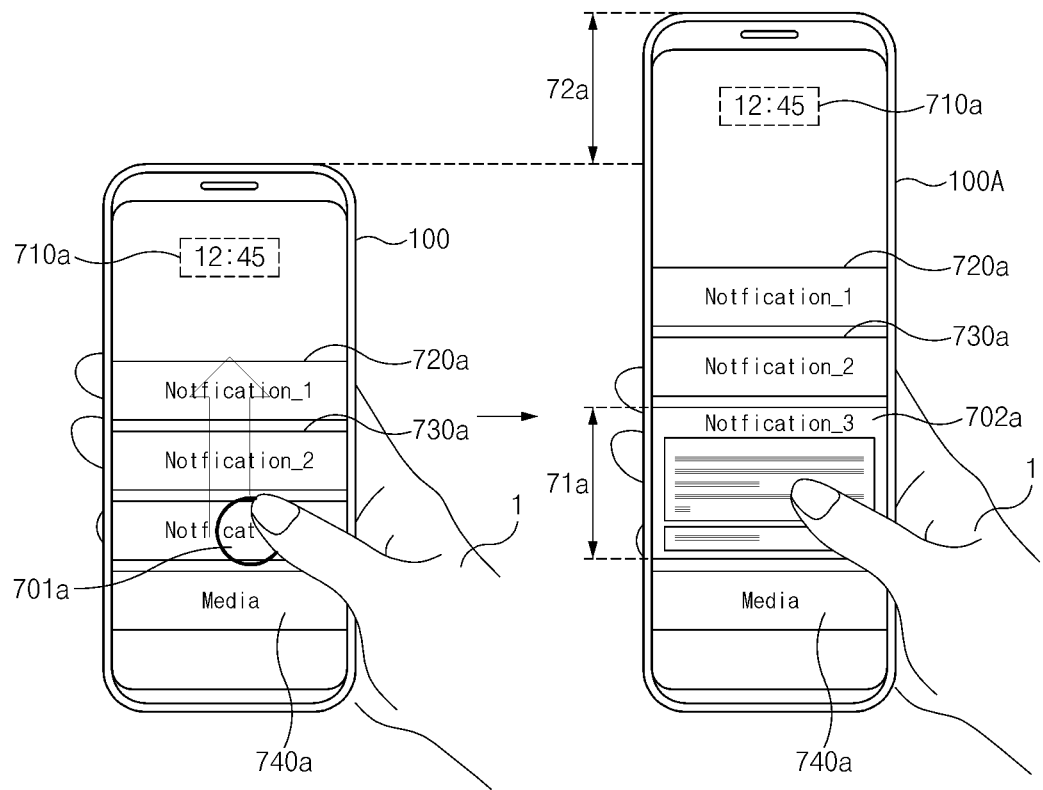
FIG. 7A illustrates a method in which an electronic device provides a user with a function or content associated with an application in a lock screen state according to an embodiment.
Figure 7B:
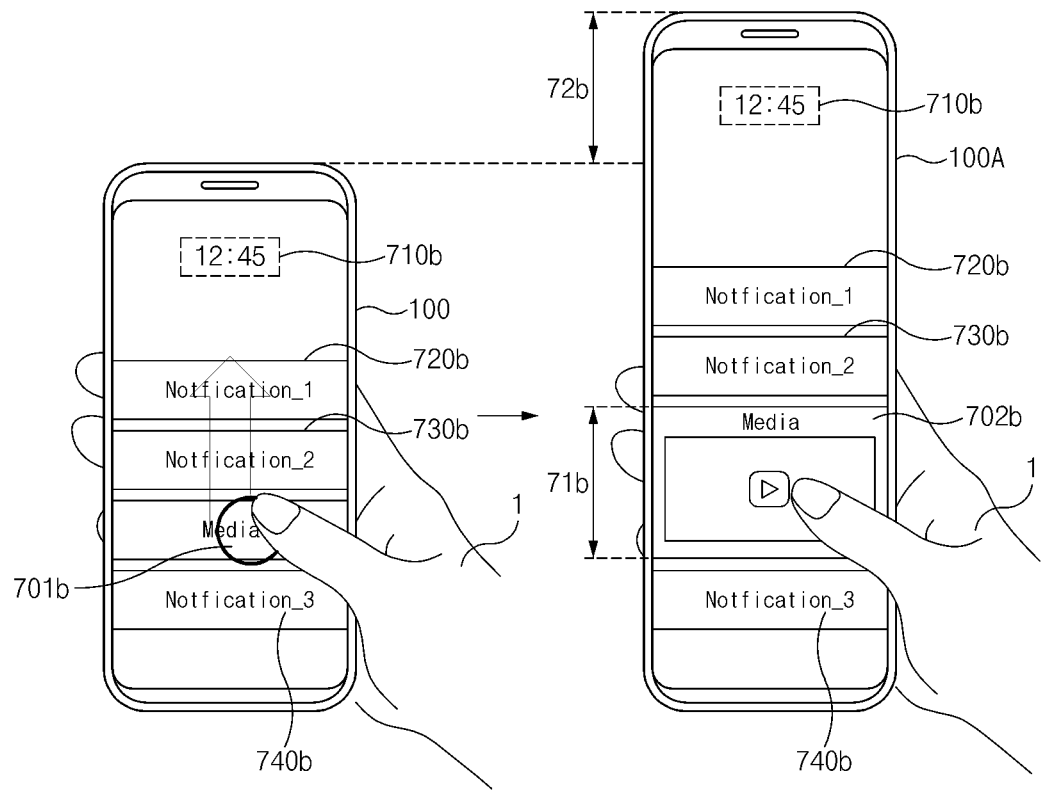
FIG. 7B illustrates a method in which an electronic device provides a user with a function or content associated with an application in a lock screen state according to another embodiment.

FIG. 7A illustrates a method in which an electronic device provides a user with a function or content associated with an application in a lock screen state according to an embodiment. FIG. 7B illustrates a method in which an electronic device provides a user with a function or content associated with an application in a lock screen state according to another embodiment.

Referring to FIGS. 7A and 7B, the electronic device 100 may indicate a case where the display is in the first state; the electronic device 100A may indicate a case where the display is in the second state. In an embodiment, the electronic device 100 or 100A may be a lock screen state.

Objects 701a and 701b output to the electronic device 100 that is in a lock screen state may be objects corresponding to the notifications of various applications. For example, the object 701a illustrated in FIG. 7A may be an object corresponding to the notification of a message application; the object 701b illustrated in FIG. 7B may be an object corresponding to the notification of a video playback application.

According to an embodiment, the input (e.g., the second input in FIG. 3) of the user 1 to the object 701a or 701b may occur. In this case, the state of the display 120 may be changed from the first state to the second state, and the electronic device 100A may output a screen 702a or 702b for specified additional information associated with the application. For example, as illustrated in FIG. 7A, the electronic device 101A may output a screen 702a that provides a specified function to view the content of the received message and to reply to the content of the received message. For another example, as illustrated in FIG. 7B, the electronic device 101A may display a screen 702b that provides a specified function to show the preview of a video corresponding to the received notification and to play the video.

According to an embodiment, the user 1 may apply an additional input to the output screen 702a or 702b. For example, the user may input and transmit a reply to the message on the output screen 702a illustrated in FIG. 7A. For another example, the user may touch at least part of the output screen 702b illustrated in FIG. 7B and may play a video corresponding to the output screen 702b.

According to an embodiment, the height 71a or 71b of the region where the screen 702a or 702b for the specified function is output may be smaller than or equal to the height 72a or 72b of the extended region of the display 120. In this way, other objects 710a, 720a, 730a, 740a, 710b, 720b, 730b, and 740b that have been output to the display 120 in the first state may not be affected by the output of the specified content. For example, the first objects 710a and 710b for the clock application or the objects 720a, 730a, 740a, 720b, 730b, and 740b corresponding to various notifications may not be affected by the output of the screen for the function. In an embodiment, when the display 120 is in the second state, at least part of the objects 710*a*, 720*a*, 730*a*, 740*a*, 710*b*, 720*b*, 730*b*, and 740*b* may be output as it is at the location where the at least part of the objects 710*a*, 720*a*, 730*a*, 740*a*, 710*b*, 720*b*, 730*b*, and 740*b* has been output when the display 120 is in the first state.

According to an embodiment, the operation in which the electronic device 100 or 100A outputs the specified additional information may be performed in the state of the electronic device 100 or 100A, for example, a state where the lock screen state is maintained. In other words, the electronic devices 100 and 100A may maintain a lock screen state even though the screens 702*a* and 702*b* for the specified additional information are output.

Figure 8A:
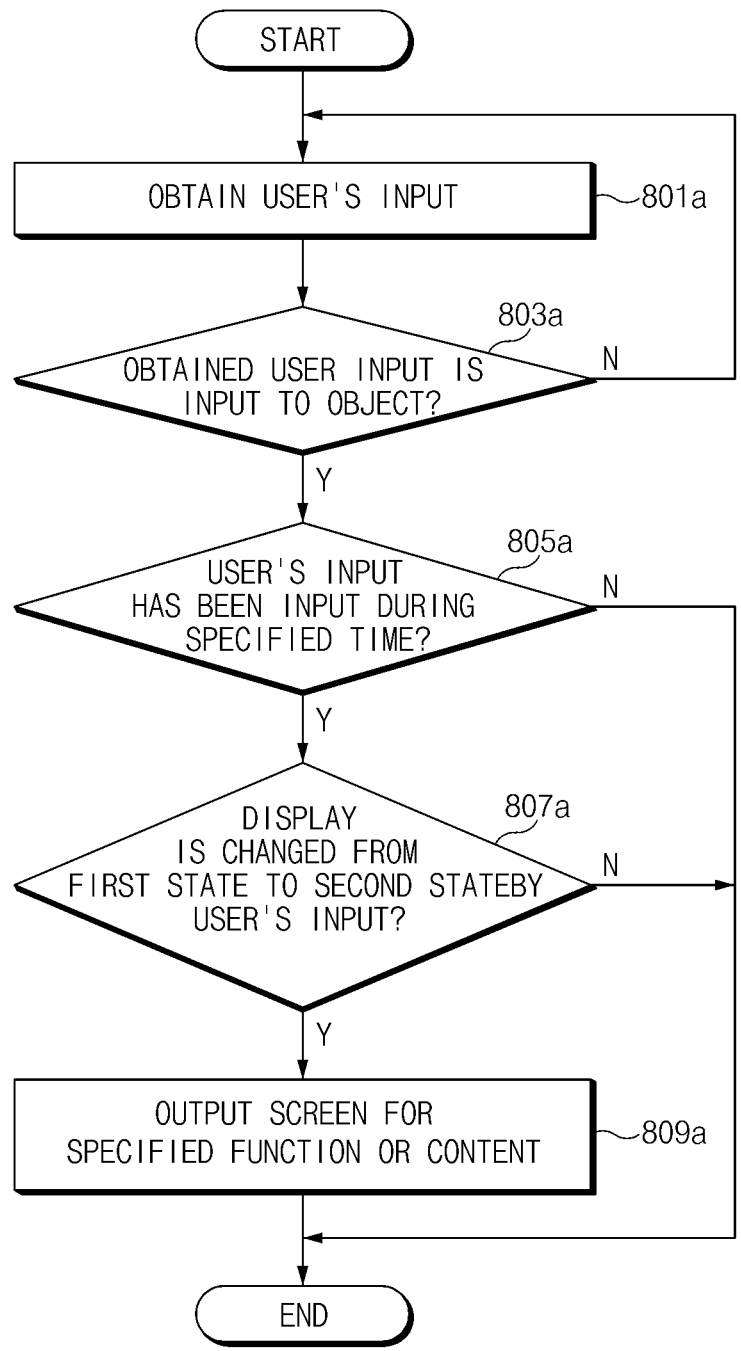
FIG. 8A is a flowchart illustrating a method, in which an electronic device obtains a user input, according to an embodiment.

FIG. 8A is a flowchart illustrating a method for an electronic device to provide a function or content associated with an application based on a user input according to an embodiment.

Referring to FIG. 8A, a method in which the electronic device 100 provides a function or content associated with an application based on a user input may include operation 801*a* to operation 809*a*. In an embodiment, operation 801*a* to operation 809*a* may correspond to operation 307 to operation 309 illustrated in FIG. 3. According to an embodiment, operation 801*a* to operation 809*a* may be performed by the electronic device 100 including a touch sensor.

In operation 801*a*, the electronic device 100 may obtain a user's input. For example, a user may apply a touch input to at least a partial region of the display 120. The electronic device 100 may detect the touch input of the authorized user through the touch sensor. When the touch input occurs at a specified location to be greater than or equal to a specified sensitivity, the electronic device 100 may obtain the user's input.

In operation 803*a*, the electronic device 100 may determine whether the obtained user input is an input to an object (e.g., 101 in FIG. 1). For example, the electronic device 100 may obtain coordinates of a location where a user input occurs, through a touch sensor and may compare a location where the user input occurs with a location where the object is output. In an embodiment, when the user's input is an input to the object, the electronic device 100 may perform operation 805*a*; when the user's input is not an input to the object, the electronic device 100 may perform operation 801*a* again.

In operation 805*a*, the electronic device 100 may determine whether the user's input to the object has been continuously input during a specified time.

According to an embodiment, the specified time may be configured to correspond to one of a plurality of time sections.

According to an embodiment, the plurality of time sections may include a first section corresponding to 0 seconds to t1 seconds, a second section corresponding to t1 seconds to t2 seconds, and a third section corresponding to t2 seconds or more (0<t1<t2<t3). In this case, the specified section may be set as the second section. For example, when the time at which the user's input is input corresponds to the first section, the electronic device 100 may execute an application corresponding to the object and may terminate the operation. When the time at which the user's input is input corresponds to the third section, the electronic device 100 may recognize the user's input as a long press, may perform an operation corresponding thereto, and may terminate the operation. When the time at which the user input is input corresponds to the second section, the electronic device 100 may perform operation 807*a*.

In operation 807*a*, the electronic device 100 may determine whether a state of the display 120 is changed from a first state to a second state by the user's input. When the state of the display 120 is changed by the user's input, the electronic device 100 may recognize the user's input as the second input of the present disclosure and may perform operation 809*a*. When the state of the display 120 is changed by the user's input, the electronic device 100 may terminate the operation.

In operation 809*a*, the electronic device 100 may output a screen (e.g., 102 of FIG. 1) for a specified function or content. According to an embodiment, operation 809*a* may be identical or similar to operation 309 illustrated in FIG. 3. The electronic device 100 may output a screen for additional information about an application corresponding to an object where the user's input occurs. The additional information may include a specified function or content associated with the application.

Through operation 801*a* to operation 809*a*, the electronic device 100 may provide a function or content associated with an application to the user with a minimal user input.

Figure 8B:
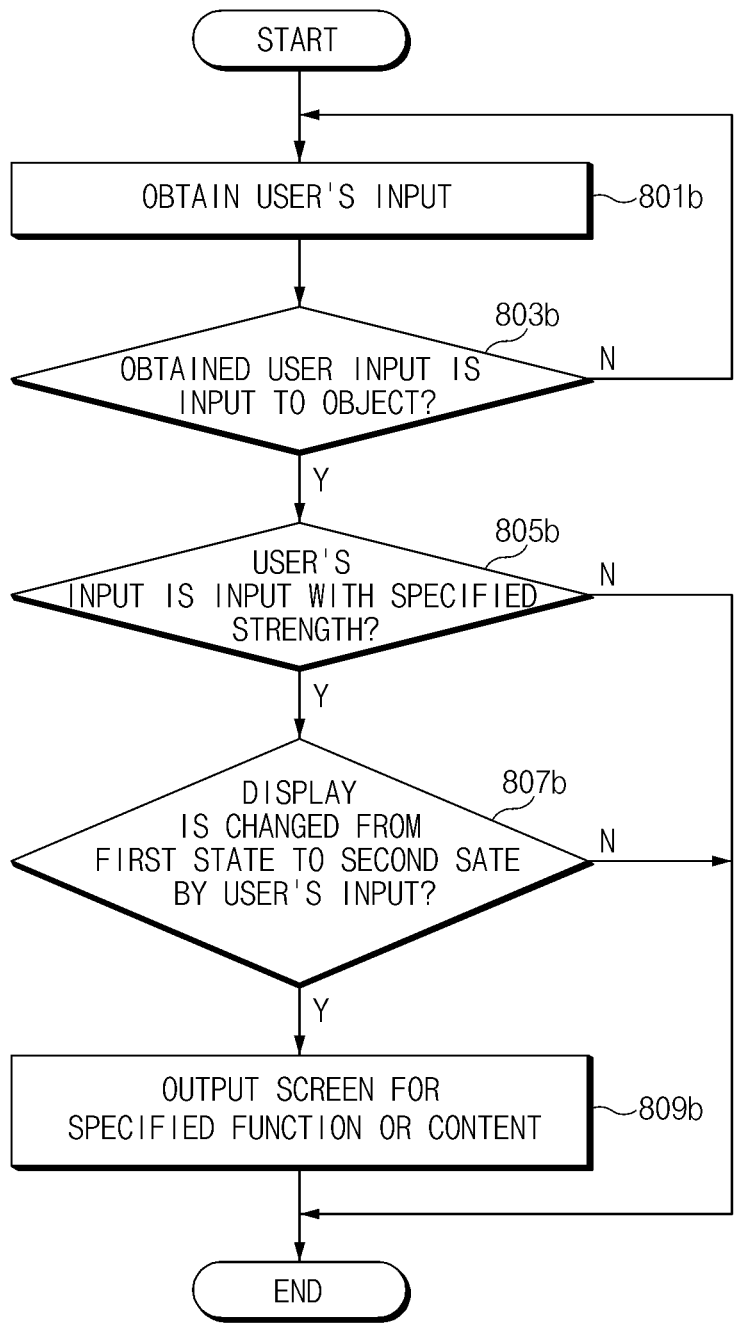
FIG. 8B is a flowchart illustrating a method, in which an electronic device obtains a user input, according to another embodiment.

FIG. 8B is a flowchart illustrating a method for an electronic device to provide a function or content associated with an application based on a user input according to another embodiment.

Referring to FIG. 8B, a method in which the electronic device 100 provides a function or content associated with an application based on a user input may include operation 801*b* to operation 809*b*. In an embodiment, operation 801*b* to operation 809*b* may correspond to operation 307 to operation 309 illustrated in FIG. 3. According to an embodiment, operation 801*b* to operation 809*b* may be performed by the electronic device 100 including a pressure sensor.

According to an embodiment, each operation illustrated in FIG. 8B may be identical or similar to each operation illustrated in FIG. 8A other than operation 805*b*. Accordingly, in the description of FIG. 8B, descriptions of operation 801*b*, operation 803*b*, operation 807*b*, and operation 809*b* are replaced with the descriptions of operation 801*a*, operation 803*a*, operation 807*a*, and operation 809*a* of FIG. 8, respectively.

In operation 805*b*, the electronic device 100 may determine whether the pressure of a user's input to the object is input with a specified strength. According to an embodiment, the specified strength may be configured to correspond to one of a plurality of sections.

According to an embodiment, the plurality of sections may include a first section corresponding to 0 to p1 and a second section corresponding to p1 or more (0<p1<p2). In this case, the specified section may be set as the first section. For example, when the pressure of the user's input corresponds to the second section, the electronic device 100 may recognize the user's input as a pressure input, may perform an operation corresponding thereto, and may terminate the operation. When the pressure of the user's input corresponds to the first section, the electronic device 100 may perform operation 807*b*.

Through operation 801*b* to operation 809*b*, the electronic device 100 may provide a function or content associated with an application to the user with a minimal user input.

Figure 9:
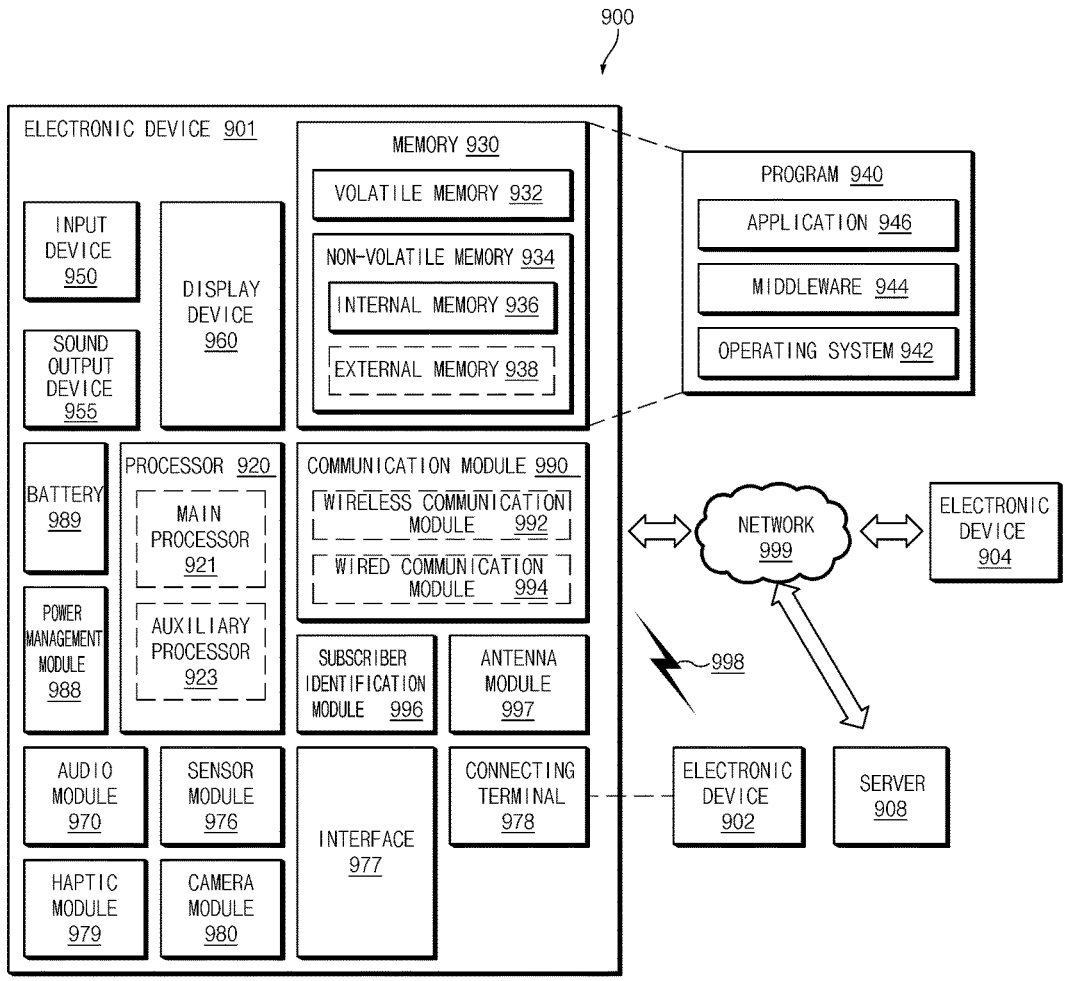
FIG. 9 is a block diagram of an electronic device in a network environment according to various embodiments.

FIG. 9 is a block diagram illustrating an electronic device 901 in a network environment 900 according to various embodiments.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

According to an embodiment disclosed in this specification, an electronic device may include a housing including a cover glass and a rear cover facing the cover glass, a display including a first region and a second region connected to one end of the first region, and having a first state where the first region is exposed to an outside of the electronic device via the cover glass and a second state where the first region and the second region are exposed to the outside of the electronic device via the cover glass, and a processor electrically connected to the display. The processor may be configured to obtain a first input of a user, to set a function or content associated with an application based on the first input, to output an object corresponding to the application, to the first region while the display is in the first state, to obtain a second input of a user, which is input to the object, and to output a screen for the set function or content to the display when the display is changed from the first state to the second state by the second input.

According to an embodiment, the processor may be configured to obtain the second input in a lock screen state and to output a screen for the set function or content to the display, in a state where the lock screen state is maintained.

According to an embodiment, the processor may be configured to output the object and at least one object different from the object to the first region when the display is in the first state and to output at least part of the at least one object at a location where the at least part of the at least one object has been output when the display is in the first state when the display is changed to the second state in the first state.

According to an embodiment, the processor may be configured to output a screen for the set function or content to the display at a height smaller than or equal to a height of the second region.

According to an embodiment, the electronic device may further include a touch sensor for sensing an input of a user. The processor may be configured to obtain the first input or the second input, using the touch sensor. In an embodiment, the processor may be configured to recognize the input of the user as the second input when the input of the user sensed by the touch sensor is continued during a specified time range.

According to an embodiment, the electronic device may further include a pressure sensor for sensing a pressure of an input of a user. The processor may be configured to obtain the first input or the second input, using the pressure sensor. In an embodiment, the processor may be configured to recognize the input of the user as the second input when the pressure of the input of the user sensed by the pressure sensor corresponds to a specified pressure range.

According to an embodiment, the application may be a phone application. The function or content associated with the application may include at least one of favorite information, an emergency call function, or an address book search function. In an embodiment, the processor may be configured to set the function or content associated with the application to the favorite information based on the first input, to obtain a third input of a user to at least part of the output screen, and to attempt to make a call to a contact address corresponding to the third input.

According to an embodiment, the second input may include a pressure applied to the cover glass or the rear cover in a specified direction. In an embodiment, the specified direction may be an up-down direction on the cover glass.

According to an embodiment, the housing may further include a physical button. The second input may include an input to the physical button.

According to an embodiment disclosed in this specification, a method in which an electronic device provides a function or content associated with an application may include obtaining a first input of a user, setting a function or content associated with an application based on the first input, outputting an object corresponding to the application to the first region while a display including a first region and a second region connected to one end of the first region is in a first state, obtaining a second input of a user, which is input to the object, and outputting a screen for the set function or content to the display when the display is changed from the first state to a second state by the second input. The first state may be a state where the first region is exposed to an outside of an electronic device via a cover glass. The second state may be a state where the first region and the second region are exposed to the outside of the electronic device via the cover glass.

According to an embodiment, the method may further include outputting the object and at least one object different from the object to the first region while the display is in the first state and outputting at least part of the at least one object at a location where the at least part of the at least one object has been output when the display is in the first state, when the display is changed to the second state in the first state.

According to an embodiment disclosed in this specification, an electronic device may include a housing including a cover glass and a rear cover facing the cover glass, a display including a first region and a second region connected to one end of the first region, and having a first state where the first region is exposed to an outside of the electronic device via the cover glass and a second state where the first region and the second region are exposed to the outside of the electronic device via the cover glass, and a processor electrically connected to the display. The processor may be configured to output an object corresponding to an application, to the first region while the display is in the first state, to obtain a user input, which is input to the object, and to output a screen for a specified function or specified content associated with the application to the display when the display is changed from the first state to the second state by the user input.

According to an embodiment, the processor may be configured to obtain the user input in a lock screen state and to output a screen for the set function or content to the display, in a state where the lock screen state is maintained.

According to an embodiment, the processor may be configured to output the object and at least one object different from the object to the first region while the display is in the first state and to output at least part of the at least one object at a location where the at least part of the at least one object has been output when the display is in the first state when the display is changed to the second state in the first state.

According to an embodiment, the user input may be continuously input to the object during a specified time range.

According to an embodiment, the user input may be input to the object in a specified pressure range.

According to embodiments disclosed in the specification, an electronic device may provide a user with the function or content associated with an application, through only a minimal user input. Besides, the electronic device may provide the user with the function or content without affecting other objects or other content already output on a display. In this way, the use convenience of the user may be improved.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a housing;
   a display including a first region and a second region connected to one end of the first region, the display having a first state in which the first region, but not the second region, is exposed to an outside of the electronic device and a second state in which the first region and the second region are exposed to the outside of the electronic device as the display is extended in a first direction; and
   a processor electrically connected to the display,
   wherein the processor is configured to:
      output a plurality of objects corresponding to a plurality of notifications, to the first region when the display is in the first state;
      obtain, via the display, a first touch input starting from a point corresponding to a first object among the plurality of objects and moving in the first direction to extend the display; and
      when the display is changed from the first state to the second state by the first touch input, output content of a notification corresponding to the first object to the display.

2. The electronic device of claim 1, wherein the processor is configured to:
   obtain the first touch input in a lock screen state of the electronic device; and
   output the content of the notification in a state in which the lock screen state of the electronic device is maintained.

3. The electronic device of claim 1, wherein the processor is configured to:
   when the display is changed to the second state from the first state, output at least part of the plurality of objects at a location where the at least part of the plurality of objects was output when the display was in the first state.

4. The electronic device of claim 1, wherein the processor is configured to:
   output the content of the notification to the display with a height smaller than or equal to a height of the second region.

5. The electronic device of claim 1, further comprising:
   a touch sensor configured to sense an input,
   wherein the processor is configured to:
      obtain the first touch input, using the touch sensor.

6. The electronic device of claim 5, wherein the processor is configured to:
   when an input sensed by the touch sensor is continued during a specified time range, recognize the input as the first touch input.

7. The electronic device of claim 1, further comprising:
   a pressure sensor configured to sense a pressure of an input,
   wherein the processor is configured to:
      obtain the first touch input, using the pressure sensor.

8. The electronic device of claim 7, wherein the processor is configured to:
   when the pressure of the input sensed by the pressure sensor corresponds to a specified pressure range, recognize the input as the first touch input.

9. The electronic device of claim 1, wherein the processor is configured to, when the display is changed from the first state to the second state by the first touch input, output objects other than the first object among the plurality of objects.

10. The electronic device of claim 1, wherein the display further comprises a cover glass, and
    wherein the first touch input includes pressure applied on the cover glass.

11. The electronic device of claim 10, wherein the pressure applied on the cover glass comprises pressure in the first direction.

12. A method for providing content associated with a notification by an electronic device, the method comprising:
    outputting a plurality of objects corresponding to a plurality of notifications to the first region when a display of the electronic device is in a first state, in which only a first region of the display is exposed to an outside of the electronic device;

obtaining a first touch input starting from a point corresponding to a first object among the plurality of objects and moving in a first direction to extend the display;

controlling, in response to the first touch input, the display to be in a second state by extending the display in the first direction; and when the display is changed from the first state to the second state, outputting content of a notification corresponding to the first object, wherein the second state of the display is a state in which the first region and a second region of the display are exposed to the outside of the electronic device.

13. The method of claim 12, wherein:

the outputting of content of a notification corresponding to the first object includes, when the display is changed to the second state from the first state, outputting at least part of the plurality of objects at a location where the at least part of the plurality of objects was output when the display was in the first state.

\* \* \* \* \*